(12) United States Patent
Gordon et al.

(10) Patent No.: US 7,292,225 B2
(45) Date of Patent: Nov. 6, 2007

(54) APPARATUS FOR CONTROLLING THE POSITION OF A SCREEN POINTER THAT WIRELESSLY TRANSMITS COMPRESSED DATA

(75) Inventors: Gary B. Gordon, Saratoga, CA (US); Michael J. Brosnan, Fremont, CA (US)

(73) Assignee: Avago Technologies ECBU IP, Singapore (SG)

( * ) Notice: Subject to any disclaimer, the term of this patent is extended or adjusted under 35 U.S.C. 154(b) by 663 days.

(21) Appl. No.: 10/825,476

(22) Filed: Apr. 15, 2004

(65) Prior Publication Data

US 2005/0231472 A1    Oct. 20, 2005

(51) Int. Cl.
*G06F 3/33* (2006.01)

(52) U.S. Cl. ............... 345/163; 345/156; 345/165; 345/166

(58) Field of Classification Search ......... 345/156–168
See application file for complete search history.

(56) References Cited

U.S. PATENT DOCUMENTS

| | | | |
|---|---|---|---|
| 5,854,621 A * | 12/1998 | Junod et al. ............... | 345/158 |
| 5,881,366 A * | 3/1999 | Bodenmann et al. ...... | 455/41.2 |
| 6,160,538 A | 12/2000 | Lambrechts | |
| 6,995,750 B2 * | 2/2006 | Albulet et al. .............. | 345/168 |
| 2002/0097225 A1* | 7/2002 | Muranami ................... | 345/166 |
| 2005/0078087 A1* | 4/2005 | Gates et al. ................ | 345/163 |
| 2005/0190158 A1* | 9/2005 | Casebolt et al. ........... | 345/166 |
| 2005/0200606 A1* | 9/2005 | Willemin et al. .......... | 345/166 |

FOREIGN PATENT DOCUMENTS

| | | |
|---|---|---|
| JP | 4358219 | 6/1991 |
| JP | 6289986 | 4/1993 |
| JP | 9146703 | 6/1997 |

* cited by examiner

*Primary Examiner*—David L. Lewis

(57) ABSTRACT

An apparatus for controlling the position of a screen pointer includes a movement sensor for sensing relative movement between the apparatus and a surface, and generating corresponding movement data. The movement sensor is configured to generate compressed data representing the movement data. The apparatus includes a wireless transmitter for wirelessly transmitting the compressed data.

17 Claims, 4 Drawing Sheets

APPARATUS FOR CONTROLLING THE POSITION OF A SCREEN POINTER THAT WIRELESSLY TRANSMITS COMPRESSED DATA

THE FIELD OF THE INVENTION

This invention relates generally to devices for controlling a pointer on a display screen, and relates more particularly to an apparatus for controlling the position of a screen pointer that wirelessly transmits compressed data.

BACKGROUND OF THE INVENTION

One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and an image sensor within the optical pointing device, is optically sensed and converted into movement information.

Wireless pointing devices have also been developed. Limiting power consumption is important for wireless pointing devices, such as wireless optical mice. Battery life is an important selling feature for wireless mice. One major source of power drain in wireless optical pointing devices is the wireless communications channel. In some wireless optical pointing devices, approximately 50% of the power budget goes to the wireless channel. Most of this power is proportional to the number of bits of motion information that are transmitted via the wireless channel.

SUMMARY OF THE INVENTION

One form of the present invention provides an apparatus for controlling the position of a screen pointer. The apparatus includes a movement sensor for sensing relative movement between the apparatus and a surface, and generating corresponding movement data. The movement sensor is configured to generate compressed data representing the movement data. The apparatus includes a wireless transmitter for wirelessly transmitting the compressed data.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Wireless Pointing Device

Figure 1:
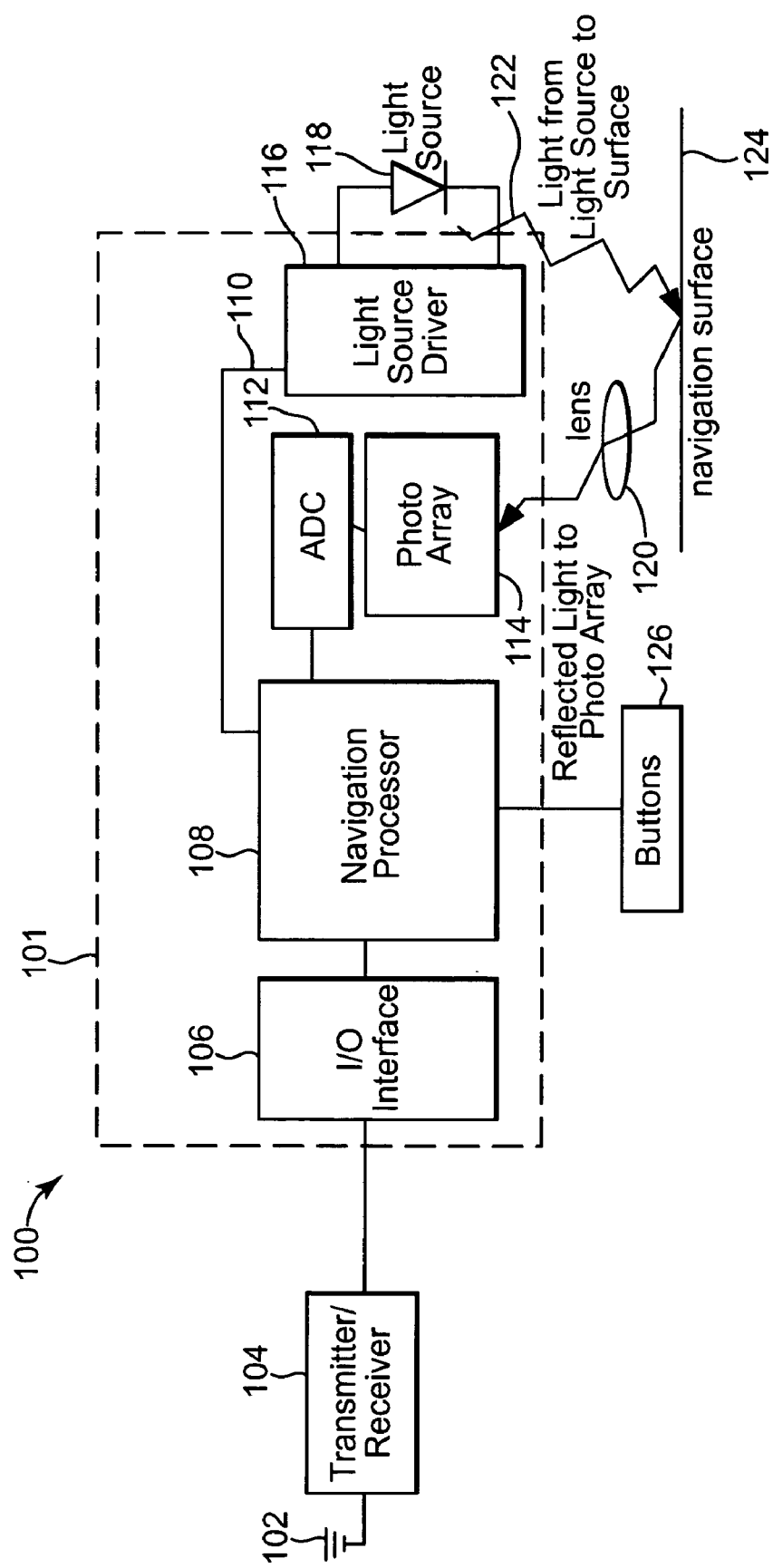
FIG. 1 is a block diagram illustrating major components of a wireless optical pointing device according to one embodiment of the present invention.

FIG. 1 is a block diagram illustrating major components of a wireless optical pointing device 100 according to one embodiment of the present invention. Optical pointing device 100 includes optical navigation sensor integrated circuit (IC) 101, antenna 102, wireless transmitter/receiver 104, light source 118, and lens 120. Optical navigation sensor (or movement sensor) 101 includes input/output interface 106, navigation processor 108, analog to digital converter (ADC) 112, photodetector array (photo array) 114, and light source driver circuit 116. In one embodiment, optical pointing device 100 is a wireless optical mouse for a desktop personal computer, workstation, portable computer, or other device. In another embodiment, optical pointing device 100 is configured as a wireless optical fingerprint sensing pointing device, or other pointing device.

In operation, according to one embodiment, light source 118 emits light 122 onto navigation surface 124, which is a desktop or other suitable imaging surface, and reflected images are generated. In one embodiment, light source 118 includes one or more light emitting diodes (LED's). In another embodiment, light source 118 is a coherent light source or an at least partially coherent light source. In one form of the invention, light source 118 is a laser. Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface under optical pointing device 100. The digital values generated by analog to digital converter 112 are output to navigation processor 108. The digital values received by navigation processor 108 are stored as frames within memory 204 (shown in FIG. 2) of navigation processor 108.

The overall size of photodetector array 114 is preferably large enough to receive an image having several features.

Images of such spatial features produce translated patterns of pixel information as optical pointing device 100 moves over navigation surface 124. The number of photodetectors in array 114 and the frame rate at which their contents are captured and digitized cooperate to influence how fast optical pointing device 100 can be moved across a surface and still be tracked. Tracking is accomplished by navigation processor 108 by comparing a newly captured sample frame with a previously captured reference frame to ascertain the direction and amount of movement.

In one embodiment, navigation processor 108 performs a cross-correlation of sequential frames to determine motion information. In one form of the invention, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by navigation processor 108 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) of a convenient granularity and at a suitable rate of information exchange, which is output via input/output interface 106 to wireless transmitter/receiver 104. Wireless transmitter/receiver 104 wirelessly transmits movement information to a host device via antenna 102. In one embodiment, optical pointing device 100 is also configured to receive data and control signals from a host device via antenna 102 and wireless transmitter/receiver 104.

In one form of the invention, navigation processor 108 is also configured to receive button press information from one or more buttons 126 of the optical pointing device 100. Existing pointing devices, such as mouse devices, typically include at least two buttons (e.g., a left and a right mouse button), and some such devices can include eight or more buttons. In one embodiment, navigation processor 108 is configured to output button press information, which identifies buttons that have been pressed by a user, via input/output interface 106 to wireless transmitter/receiver 104. Wireless transmitter/receiver 104 then wirelessly transmits button press information to a host device via antenna 102.

In one embodiment, pointing device 100 reports movement information to a host device at regular intervals. This interval of time is referred to as a reporting period. In one embodiment, the reporting period is 10 milliseconds. In other embodiments, reporting periods that are greater or less than 10 milliseconds may be used by pointing device 100. In one form of the invention, pointing device 100 captures several thousand images each second, and calculates delta-x and delta-y movement information at a faster rate than once every 10 milliseconds. The delta-x and delta-y movement information is accumulated during the reporting interval in one embodiment, and when it is time to output the next motion report, pointing device 100 outputs the accumulated delta-x and delta-y data.

Some prior pointing devices have reported delta-x information with twelve bits, delta-y information with twelve bits, and overhead with eight bits. Other prior pointing devices have reported delta-x information with eight bits, delta-y information with eight bits, and overhead with eight bits. Thus, with prior devices, a total of either 24 or 32 bits are sent during each reporting period (e.g., 10 milliseconds) to report motion information to a host device.

Some existing wireless mice can resolve 1/800 inch, and track speeds up to sixteen inches per second. A mouse that can resolve 1/800 inch is said to have a resolution of 800 CPI (counts per inch). For such a mouse, with a 10 millisecond reporting interval, the maximum motion is ±0.16 inches per interval, or ±127 increments per interval. To represent ±127 increments per interval for both the X and Y dimensions, one eight-bit word is typically used for delta-x, and another eight-bit word is typically used for delta-y. In some existing wireless mice, one eight-bit word representing delta-x and another eight-bit word representing delta-y (along with some overhead bits) are transmitted to a host device during each reporting interval (e.g., every 10 milliseconds).

One form of the present invention provides a wireless pointing device that transmits a lesser number of bits than prior art wireless pointing devices, while still providing comparable performance and accuracy. The reduction in information being transmitted provides a significant power savings over prior wireless pointing devices. In one embodiment, motion data is transmitted using an "R-theta" representation that uses a lesser number of bits than transmitting eight bits for delta-x and eight bits for delta-y during each reporting period. In another embodiment, acceleration data is transmitted rather than velocity data (e.g., delta-x and delta-y), which also provides a reduction in the amount of data that is transmitted. In another form of the invention, a compression algorithm is used to generate compressed motion data that is transmitted by a wireless optical pointing device. These embodiments are described in further detail below with reference to FIGS. 2 and 3.

II. Representations of Movement

Figure 2:
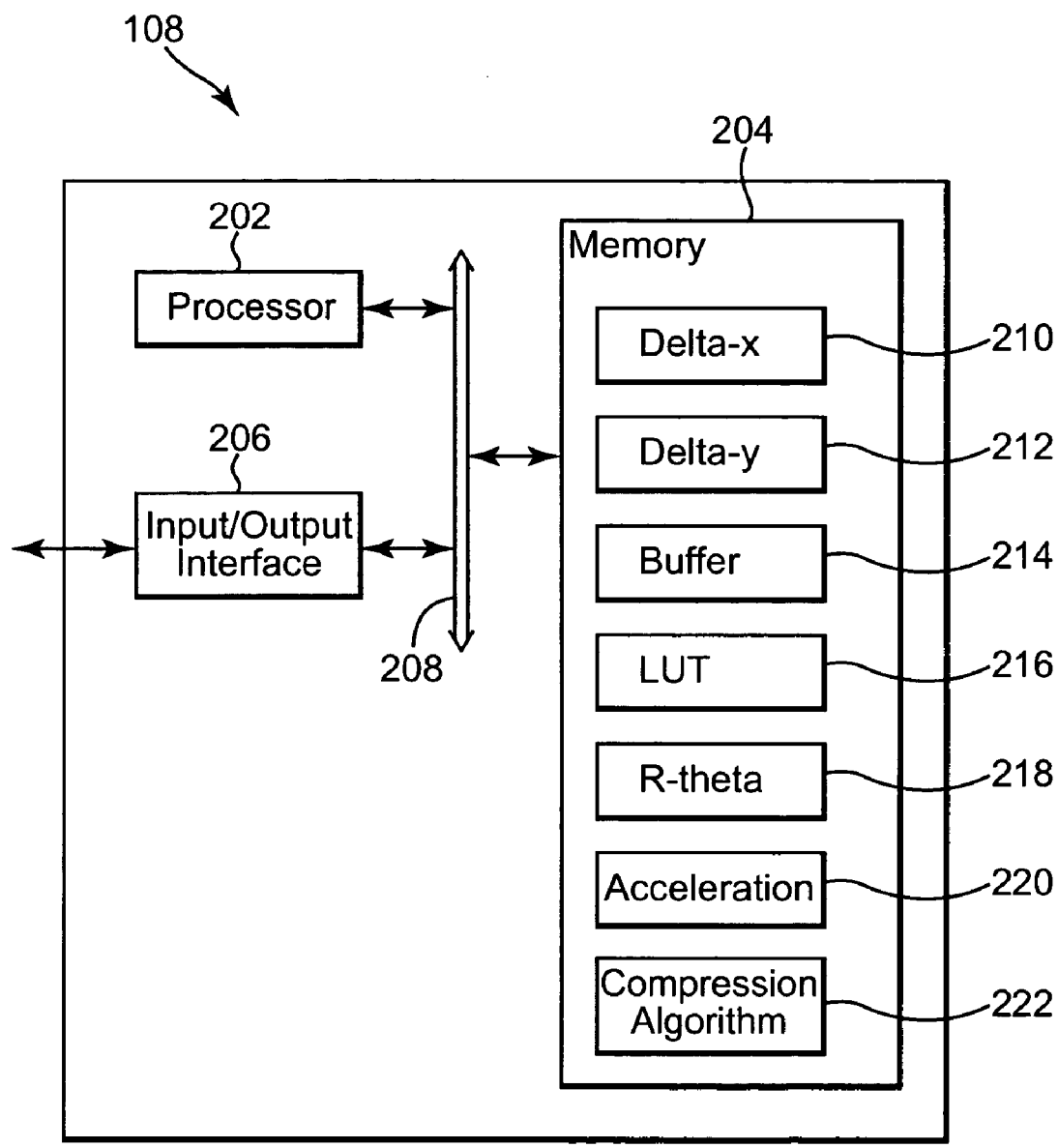
FIG. 2 is a block diagram illustrating major components of the navigation processor shown in block form in FIG. 1 according to one embodiment of the present invention.

FIG. 2 is a block diagram illustrating major components of the navigation processor 108 shown in block form in FIG. 1 according to one embodiment of the present invention. Navigation processor 108 includes processor 202, memory 204, and input/output interface 206, which are all communicatively coupled together via communication link 208. Memory 204 includes delta-x register 210, delta-y register 212, buffer 214, look-up table (LUT) 216, R-theta data 218, acceleration data 220, and compression algorithm 222. In one embodiment, processor 202 performs a cross-correlation of successively captured digital images, and calculates delta-x and delta-y values representing the movement between images. In one form of the invention, the digital images are received via input/output interface 206 and stored in memory 204. The calculated delta-x and delta-y values are accumulated during a reporting period, and stored in delta-x register 210 and delta-y register 212, respectively. In one embodiment, the delta-x and delta-y values are both 12-bit values. In another embodiment, the delta-x and delta-y values are both 8-bit values. Buffer 214 and look-up table 216 are described below with reference to FIGS. 3 and 4.

In one form of the invention, processor 202 generates an "R-theta" representation 218 of the movement of pointing device 100 for each reporting period based on the delta-x value stored in register 210 and the delta-y value stored in register 212. The R-theta representation 218 includes a magnitude value, R, that indicates a magnitude of the movement, and an angle value, theta, that represents an angle of the movement (e.g., ranging from 0 to 360 degrees).

In one form of the invention, a ten-bit R-theta value 218 is used to represent both the magnitude, R, and the angle, theta. In one embodiment, seven bits of the ten-bit R-theta value 218 are used to represent the magnitude, R, and three bits of the ten-bit value are used to represent the angle, theta. In other embodiments, a different total number of bits, and/or a different breakdown of the bits between R and theta, may be used for the R-theta representation 218, including using a greater number of bits for the angle, theta, than the magnitude, R. In one form of the invention, processor 202 generates a ten-bit R-theta value 218 during each reporting period, and outputs the R-theta value 218 via input/output interface 206. The R-theta values 218 are wirelessly transmitted by pointing device 100 to a host device via transmitter/receiver 104 and antenna 102. By transmitting a ten-bit R-theta value 218 during each reporting period, rather than two eight-bit values representing delta-x and delta-y, significant power savings are achieved using this compressed representation.

In another form of the invention, processor 202 generates acceleration values 220 based on the calculated delta-x and delta-y values to represent movement of pointing device 100. In one form of the invention, processor 202 generates the acceleration values 220 by differentiating the delta-x and delta-y values. Pointing devices may be moved at relatively high velocities, but the changes in velocity (i.e., accelerations) do not typically occur very rapidly. Thus, the accelerations are typically relatively small, and can be represented by a smaller number of bits than the velocities.

In one embodiment, an eight-bit acceleration value 220 is used to represent acceleration in both the X and Y dimensions. In one embodiment, four bits of the eight-bit acceleration value 220 are used to represent acceleration in the X dimension, and the other four bits of the eight-bit acceleration value 220 are used to represent acceleration in the Y dimension. In another embodiment, since accelerations are typically higher in the X dimension than in the Y dimension, five bits of the eight-bit acceleration value 220 are used to represent acceleration in the X dimension, and the other three bits of the eight-bit acceleration value 220 are used to represent acceleration in the Y dimension. In other embodiments, a different total number of bits, and/or a different breakdown of the bits between the X and Y dimensions, may be used for the acceleration representation 220.

In one form of the invention, processor 202 generates an eight-bit acceleration value 220 during each reporting period, and outputs the acceleration value 220 via input/output interface 206. The acceleration values 220 are wirelessly transmitted by pointing device 100 to a host device via transmitter/receiver 104 and antenna 102. By transmitting an eight-bit acceleration value 220 during each reporting period, rather than two eight-bit values representing delta-x and delta-y, significant power savings are achieved using this compressed representation.

In another form of the present invention, pointing device 100 is configured to selectively transmit either acceleration values 220 or velocity values. In one embodiment, pointing device 100 generates and wirelessly transmits acceleration values 220 when pointing device 100 is moved at relatively high speeds (e.g., if the speed of device 100 exceeds a predetermined threshold speed), and generates and wirelessly transmits velocity values (e.g., delta-x and delta-y values) when pointing device 100 is moved at relatively low speeds (e.g., if the speed of device 100 is below a predetermined threshold speed). In this manner, pointing device 100 wirelessly transmits less information at high speeds, when accuracy is less of a concern, and transmits more information at lower speeds, when accuracy is more of a concern, thereby saving more in transmission energies than a device that transmits only velocity information.

III. Compression of Movement Data

In one form of the invention, processor 202 performs a compression algorithm 222 on movement data to generate compressed movement data, which can be wirelessly transmitted with a lesser number of bits than the raw or original movement data. The movement data that is compressed by processor 202 can take several different forms, including delta-x 210 and delta-y 212 values, R-theta values 218, as well as acceleration values 220.

One form of the present invention provides a coding or compression algorithm 222 wherein only the logarithms of motion increments are transmitted to a host device, with the residues being continually added back into to subsequent transmissions. In one embodiment, delta-x and delta-y values are reported as short, rounded-log-base-2 representations. Any residues are retained and added to subsequent displacements, thus on the average correcting for errors within a reporting period (e.g., 10 milliseconds). In this embodiment, motion along any path does not accumulate errors, though the advance may include momentary microscopic axial jitters that are not visible to the human visual system. Using the logarithmic compression algorithm 222 according to one embodiment, for fast motions, the gross motion appears instantaneous, while the fine positioning completes within a few tens of milliseconds. For slow motions the tracking is essentially instantaneous. The logarithmic compression algorithm according to one form of the invention is described in further detail below with reference to FIGS. 3 and 4.

Figure 3:
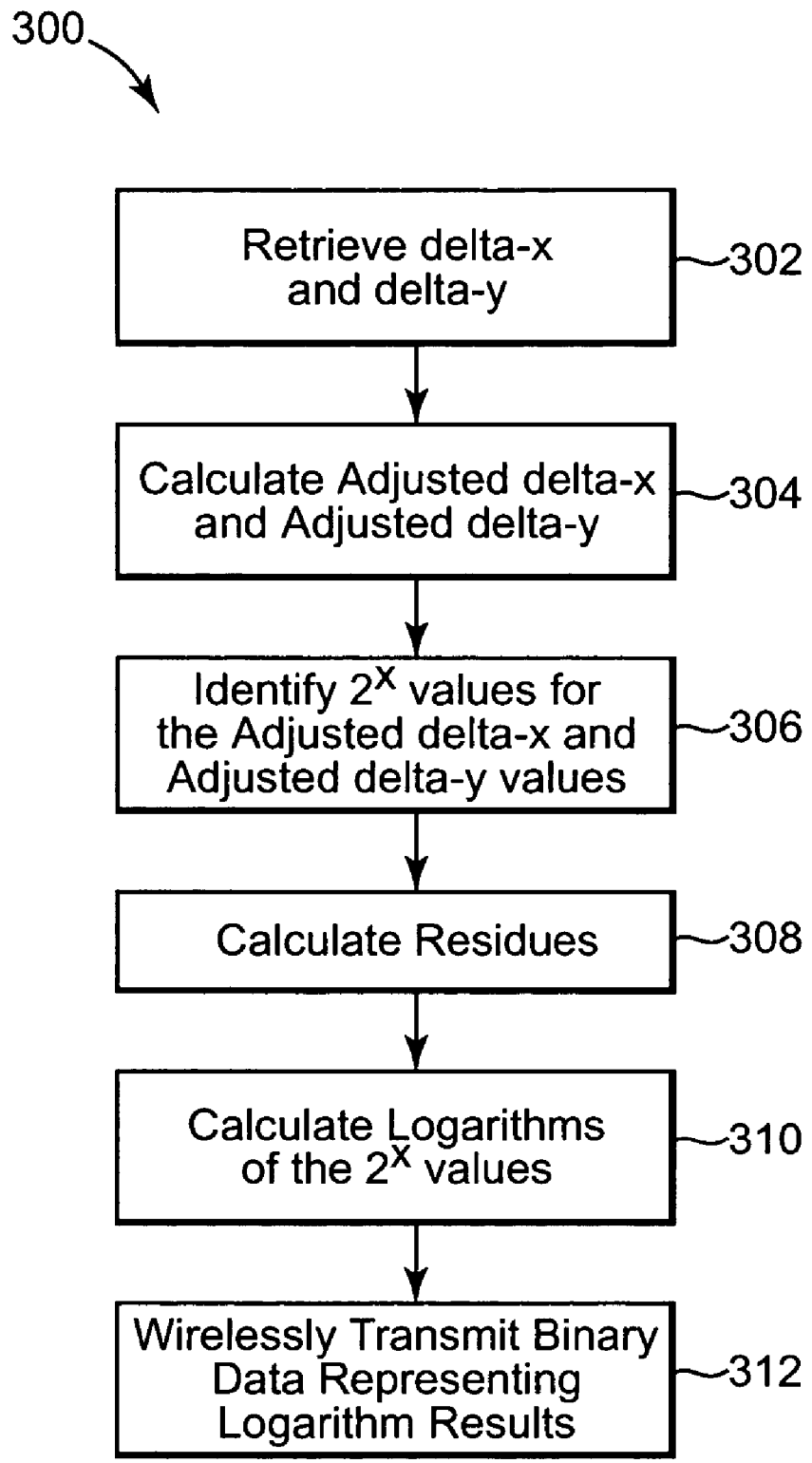
FIG. 3 is a flow diagram illustrating a method for generating compressed movement data with the wireless pointing device shown in FIG. 1 based on a logarithmic compression algorithm according to one embodiment of the present invention.

FIG. 3 is a flow diagram illustrating a method 300 for generating compressed movement data with the wireless pointing device 100 shown in FIG. 1 based on a logarithmic compression algorithm 222 according to one embodiment of the present invention. In step 302, processor 202 (FIG. 2) retrieves a delta-x value and a delta-y value for the current reporting period from memory 204. In step 304, processor 202 calculates an adjusted delta-x value and an adjusted delta-y value based on the values retrieved in step 302, and residues calculated in the previous reporting period. In one embodiment, processor 202 calculates the adjusted delta-x value by summing the current delta-x value (retrieved in step 302) and the previously determined residue for the X dimension, and calculates the adjusted delta-y value by summing the current delta-y value (retrieved in step 302) and the previously determined residue for the Y dimension.

In step 306, processor 202 identifies a first $2^x$ value, where x is an integer, (e.g., $2^0=1$, $2^1=2$, $2^2=4$, $2^3=8$, etc.), that is closest to the adjusted delta-x value, and identifies a second $2^x$ value that is closest to the adjusted delta-y value. Thus, the adjusted delta-x value has a corresponding $2^x$ value, and the adjusted delta-y value has a corresponding $2^x$ value.

In step 308, processor 202 calculates a residue value for the X dimension, and a residue value for the Y dimension. In one form of the invention, processor 202 calculates the residue value for the X dimension by subtracting the $2^x$ value corresponding to the adjusted delta-x value from the adjusted delta-x value, and calculates the residue value for the Y dimension by subtracting the $2^x$ value corresponding to the adjusted delta-y value from the adjusted delta-y value.

In step 310, processor 202 calculates the logarithm-base-two of the $2^x$ value corresponding to the adjusted delta-x value, and calculates the logarithm-base-two of the $2^x$ value corresponding to the adjusted delta-y value. In step 312, pointing device 100 wirelessly transmits binary data representing the result of the logarithms calculated in step 310.

Figure 4:
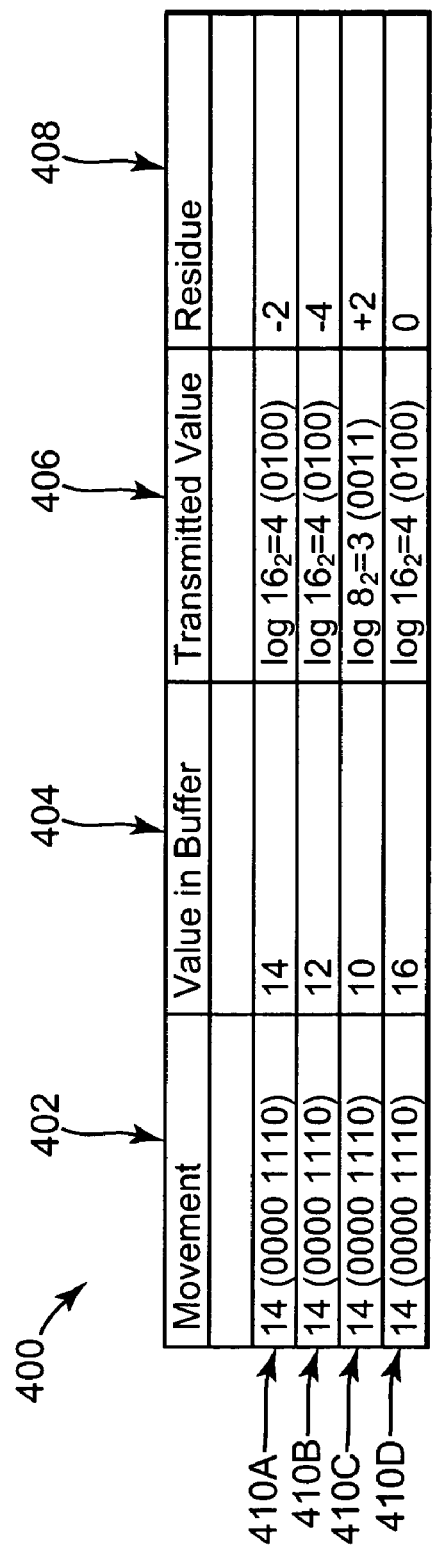
FIG. 4 is a diagram illustrating a table of example values for the logarithmic compression algorithm according to one embodiment of the present invention.

The method 300 shown in FIG. 3 is described in further detail below with reference to FIG. 4. FIG. 4 is a diagram illustrating a table 400 of example values for the logarithmic compression algorithm 222 according to one embodiment of the present invention. Table 400 includes four columns 402-408, and four rows 410A-410D. Rows 410A-410D represent four consecutive reporting periods. Column 402 includes movement values representing the movement of pointing device 100 in the X dimension during each reporting period (i.e., delta-x). Column 404 includes buffer values that are stored in buffer 214 (FIG. 2) of navigation processor 108 during each reporting period. Column 406 includes transmitted values that are wirelessly transmitted by pointing device 100 to a host device during each reporting period. Column 408 includes residue values for each reporting period.

It is assumed for the example shown in FIG. 4 that pointing device 100 is moved in the positive X direction at a fixed rate of 14 pixels during each reporting period. Thus, for the four consecutive reporting periods shown in FIG. 4 (represented by entries 410A-410D), the value in column 402 is the same (i.e., 14 pixels, or binary "00001110"). In one embodiment, during each reporting period, processor 202 adjusts the current delta-x value (column 402) based on a previously calculated residue (column 408), and stores the adjusted movement value (column 404) in buffer 214. It is assumed that the reporting period 410A is the first reporting period, so there has not been a previously calculated residue. Thus, the delta-x value (14 pixels) for this reporting period 410A is stored in buffer 214 without adjustment.

For each reporting period, processor 202 determines a logarithm value and a residue value corresponding to the current value stored in the buffer 214. In one embodiment, processor 202 determines a $2^x$ value, where x is an integer (e.g., $2^0=1$, $2^1=2$, $2^2=4$, $2^3=8$, etc.), that is closest to the value stored in buffer 214. Thus, for the first reporting period 410A, which has a value of "14" stored in buffer 214, the value "16" (i.e., $2^4$) is chosen. The logarithm-base-two of the chosen value (i.e., $\log 16_2$) is calculated, and the result (i.e., "4" or binary "0100") is the value that is wirelessly transmitted by pointing device 100 to a host. As will be understood by persons of ordinary skill in the art, the host device would be configured to perform the inverse logarithm of the received value to determine the movement.

For the first reporting period 410A, since the value of "16" was reported by pointing device 100 (using the encoded representation "0100"), rather than the movement of "14" pixels that is stored in the buffer 214, the motion was essentially over-reported by two pixels. To correct for this over-reporting, a residue value is calculated by subtracting the un-encoded transmitted value (i.e., "16") from the value in buffer 214 (i.e., "14"). Thus, as shown in column 408, for the first reporting period 410A, the calculated residue is "−2".

The residue value from a previous motion report is used to adjust the next successive motion report. As described above, the residue from the first reporting period 410A was "−2". For the second reporting period 410B, processor 202 adjusts the current delta-x value (column 402), which is again "14", based on the previously calculated residue value of "−2," and stores the adjusted movement value (i.e., "12", as shown in column 404) in buffer 214. In one embodiment, the current delta-x value is adjusted by summing the current delta-x value and the residue value from the previous reporting period.

For the second reporting period 410B, which has a value of "12" stored in buffer 214, the value "16" (i.e., $2^4$) is selected by processor 202 to represent the movement. The logarithm-base-two of the chosen value is calculated, and the result (i.e., "4" or binary "0100") is the value that is wirelessly transmitted by pointing device 100 to a host. For the second reporting period 410B, since the value of "16" was reported by pointing device 100 (using the encoded representation "0100"), rather than the movement of "12" pixels that is stored in buffer 214, the motion was essentially over-reported by four pixels. To correct for this over-reporting, a residue value is calculated by subtracting the un-encoded transmitted value (i.e., "16") from the value in buffer 214 (i.e., "12"). Thus, as shown in column 408, for the second reporting period 410B, the calculated residue is "−4".

For the third reporting period 410C, processor 202 adjusts the current delta-x value (column 402), which is again "14", based on the previously calculated residue value of "−4," and stores the adjusted movement value (i.e., "10", as shown in column 404) in buffer 214. For the third reporting period 410C, which has a value of "10" stored in buffer 214, the value "8" (i.e., $2^3$) is selected by processor 202 to represent the movement. The logarithm-base-two of the chosen value is calculated, and the result (i.e., "3" or binary "0011") is the value that is wirelessly transmitted by pointing device 100 to a host.

For the third reporting period 410C, since the value of "8" was reported by pointing device 100 (using the encoded representation "0011"), rather than the movement of "10" pixels that is stored in buffer 214, the motion was essentially under-reported by two pixels. To correct for this under-reporting, a residue value is calculated by subtracting the un-encoded transmitted value (i.e., "8") from the value in buffer 214 (i.e., "10"). Thus, as shown in column 408, for the third reporting period 410C, the calculated residue is "+2".

For the fourth reporting period 410D, processor 202 adjusts the current delta-x value (column 402), which is again "14", based on the previously calculated residue value of "+2," and stores the adjusted movement value (i.e., "16", as shown in column 404) in buffer 214. For the fourth reporting period 410D, which has a value of "16" stored in buffer 214, the value "16" (i.e., $2^4$) is selected by processor 202 to represent the movement. The logarithm-base-two of the chosen value is calculated, and the result (i.e., "4" or binary "0100") is the value that is wirelessly transmitted by pointing device 100 to a host.

For the fourth reporting period 410D, since the value of "16" was reported by pointing device 100 (using the encoded representation "0100"), and since that is the same value that is stored in buffer 214, the motion was reported correctly. Thus, as shown in column 408, for the fourth reporting period 410D, the calculated residue is "0".

As another example, a constant motion of 12 pixels per reporting period in the positive X direction would not be reported as binary "0000 1100" per reporting period. Rather, pointing device 100 according to one form of the invention would report this constant motion of 12 pixels per reporting period as alternating reports of "0100" and "0011," which is the binary logarithmic representation for sending 8 pixels for one reporting period, and 16 pixels for the next reporting period.

In the above two examples, the greatest error is only four pixels, and this error persists for only one reporting period (e.g., 10 milliseconds). Assuming a mouse resolution of 0.001 inches, the screen pointer motion would be in error by as much as 0.004 inches of mouse motion for a brief time (e.g. 10 milliseconds) before it is corrected. These transient errors due to the logarithmic encoding will go unnoticed by the user since the errors are corrected so quickly. Further, the transient error is the smallest when it matters the most (e.g., when it would be most noticeable to a user), which is during fine "finesse" mouse movements. The use of this logarithmic representation of the motion results in a high degree of compression because coarse motion information is reported instantly, while finer motion is averaged over several reports.

In some existing pointing devices, delta-x and delta-y are each eight-bit two's complement numbers, and each represents motions ranging from −128 to +127 (i.e., −128, −127, . . . , −1, 0, +1, . . . , +127). Thus, delta-x and delta-y each represents one of 256 different motion states. Using logarithmic compression according to one form of the invention, and only transmitting states of $\pm 2^x$, where x is an integer, the number of states is reduced to 17 (i.e., $-2^7$, $-2^6$, . . . , $-2^0$, 0, $+2^0$, . . . , $+2^6$, $+2^7$) for the X dimension, and 17 states for the Y dimension, which corresponds to 5 bits for delta-x, and 5 bits for delta-y. Thus, in one embodiment, a total of 10 bits are transmitted by pointing device 100 during each reporting period to report X and Y motion information using logarithmic compression algorithm 222, rather than 16 bits as has been done with previous pointing devices.

With 17 states for delta-x and 17 states for delta-y, the total number of possible states for the combination of the delta-x and delta-y information is 289 states (17×17=289), which can be represented by 9 bits. Thus, by transmitting a value representing the combined delta-x and delta-y information, another bit is saved in the wireless transmission (i.e., 9 bits rather than 10 bits). In one form of the invention, lookup table 216 (FIG. 2) stores a plurality of 9-bit values representing the possible combinations of states for delta-x and delta-y. In one embodiment, the five-bit logarithm values for the X and Y movement are provided as an input to the lookup table 216, and a corresponding 9-bit value is output from the lookup table 216, and wirelessly transmitted from the pointing device 100.

The use of a 9-bit value to represent delta-x and delta-y information also allows a greater number of motion states to be represented than just the 256 different motion states represented in some existing systems. For example, for mouse motions up to ±512 states per reporting period (e.g., 10 milliseconds), 21 states would be used in the logarithmic compression algorithm 222 (i.e., $-2^9$, $-2^8$, . . . , $-2^0$, 0, $+2^0$, . . . , $+2^9$). For both the X and the Y dimensions, a total of 21×21=441 states are possible. Thus, the combined delta-x and delta-y information (e.g., using lookup table 216) for each reporting period can be wirelessly transmitted using 9 bits, with each axis (X and Y) generating slightly less than 4.5 bits of information.

In one form of the present invention, delta-x and delta-y information is compressed or encoded into only 9 bits of information during each reporting period, but substantially the same performance is obtained compared to previous systems that have used 24 bits (i.e., 12 bits for delta-x and 12 bits for delta-y), and systems that have used 16 bits (i.e., 8 bits for delta-x and 8 bits for delta-y). When compared to a system that transmits 16 bits for delta-x and delta-y, the smaller 17-bit versus 32-bit packets (including 8-bit headers) saves 47% in transmitter power. If headers are eliminated, the power savings are even greater.

In one embodiment, a further reduction in the amount of motion information that is transmitted is provided by using asymmetrical states for one, or both, of the X and Y dimensions (e.g., tracking mouse motions in the range of −256 to +512 states per reporting period for a given dimension, rather than ±512 states), and/or using a lesser number of states for one dimension (e.g., Y) than the other dimension (e.g., X), and/or using a lesser number of states for one direction (e.g., +Y) than the opposite direction (e.g., −Y). Some examples include using ±512 states for the X dimension, and −256 to +512 states for the Y dimension; or using ±512 states for the X dimension, and ±256 states for the Y dimension. Other variation may also be used in other embodiments.

In another form of the present invention, pointing device 100 is configured to use logarithmic compression algorithm 222 to generate and wirelessly transmit one eight-bit byte during each reporting period to represent X and Y motion information, with 4 bits allocated to each of the X and Y dimensions. Depending on the tradeoff between speed and resolution, several different performance levels can be achieved, such as ±8 inches/second in the X and Y dimensions at 800 CPI, or ±16 inches/second at 400 CPI. For example, if pointing device 100 is scaled for 1.5 inches=full screen, peak speeds of 8 inches/second can be tracked, and reported using one eight-bit byte per reporting period.

Higher speeds, such as 16 inches/second, can also be tracked, and reported using one eight-bit byte per reporting period, while maintaining the 800 CPI resolution, although there is a possibility of a slightly higher degree of "stuttering" at high speeds. However, such stuttering is still likely to be unnoticeable to the human visual system. For example, to track higher speeds while still maintaining 800 CPI and eight-bit reporting according to one embodiment, one or more of the levels of motion magnitude are eliminated (i.e., one or more of the $2^x$ states are not used). In one form of the invention, rather than using seventeen $2^x$ states (i.e., $-2^7$, $-2^6$, . . . , $-2^0$, 0, $+2^0$, . . . , $+2^6$, $+2^7$) for the X dimension, and seventeen $2^x$ states for the Y dimension, the state of "$-2^6$" is dropped (i.e., not used), but the state $+2^6$ (as well as the other states) are still reported. This coding reduces the reporting requirement to 16 states each for the X and Y dimensions, which can both then be accommodated in one 8-bit byte. Thus, pointing device 100 according to one embodiment of the present invention can track speeds of 16 or 32 inches per second at an 800 CPI resolution, while wirelessly reporting only one eight-bit byte per reporting period.

Another embodiment of pointing device 100 takes advantage of the fact that the fastest movements are typically in the X dimension, and uses full 16 inches/second encoding of delta-x, but only 8 inches/second encoding of delta-y. In this embodiment, pointing device 100 still works at higher Y speeds, but the speeds are essentially clamped.

One form of the present invention provides efficient data encoding for a wireless optical pointing device 100. One embodiment of the invention enhances the battery life of a wireless optical pointing device 100 by using optimal data encoding and compression. One form of the present invention saves 50% in transmission energies, using one 8-bit byte for both X and Y motion information instead of the previously used two 8-bit bytes, while allowing mouse speeds two to four times higher than existing mouse devices.

In another form of the invention, rather than using a logarithmic compression algorithm 222 as described above, or in addition to using such an algorithm, pointing device 100 is configured to use another compression algorithm 222, such as a run-length encoding algorithm, Huffman encoding algorithm, or other compression algorithm.

IV. Additional Reduction of Transmitted Data

In one form of the invention, pointing device 100 provides an additional reduction in the amount of data that is wirelessly transmitted by using variable-sized transmissions from one motion report to the next, and/or using irregular reporting intervals. In one embodiment, pointing device 100 is configured to wirelessly transmit a lesser number of bits for smaller movements of the device 100, and a greater number of bits for larger movements of the device 100.

In one form of the invention, navigation processor 108 is configured to determine if there has been any change in motion since a previous motion report, and cause motion information to be wirelessly transmitted only if there has been such a change in motion. In this embodiment, if the pointing device 100 is not being moved, or if the pointing device 100 is being moved at a constant velocity, then pointing device 100 does not transmit any motion information during these reporting periods, essentially skipping one or more reporting periods. This embodiment essentially provides an irregular reporting interval, or a reporting interval that is at a non-constant rate, wherein, for example, motion information is wirelessly reported only when there has been a change from a previous motion report. The host device would then be configured to repeat the action from the previous motion report.

In another form of the invention, pointing device 100 is configured to wirelessly report movement information at a reporting interval that varies based on the speed of movement of the device 100. In one embodiment, pointing device 100 is configured to wirelessly report smaller movements of device 100 at a slower reporting rate than larger movements of device 100, which are reported at a faster reporting rate.

In addition to wirelessly transmitting motion information, in one form of the invention, pointing device 100 is also configured to wirelessly transmit button press information that identifies buttons 126 (e.g., left or right mouse buttons, scroll devices, etc.) on device 100 that have been pressed by a user. In existing pointing devices, button press information is sent every reporting period, along with the motion information. However, the buttons of a pointing device are typically not used very frequently. One form of the pointing device 100 provides a reduction in the amount of data that is wirelessly transmitted by only transmitting button press information when a button is actually pressed, rather than every reporting period.

In one embodiment, navigation processor 108 (FIG. 1) is configured to receive button press information from one or more buttons 126 of the optical pointing device 100. If navigation processor 108 senses that a button 126 has been pressed, navigation processor 108 causes corresponding button press information to be wirelessly transmitted during the next reporting period via wireless transmitter/receiver 104 and antenna 102. In one form of the invention, navigation processor 108 is configured to output button press information only when navigation processor 108 senses that a button 126 has been pressed. In this embodiment, navigation processor 108 is configured to output only motion information during some reporting periods (i.e., with no button press information), and output both motion information and button press information during other reporting periods. In one embodiment, navigation processor 108 uses a compression algorithm to compress the button press information before transmission, thereby providing a further reduction in the amount of transmitted data and a further decrease in the transmission energy that is expended.

If a pointing device includes N buttons, typically an N-bit value is transmitted from the device to indicate which buttons were pushed by a user. The N-bit value may identify more than one button, indicating that two or more buttons have been pressed simultaneously. The N-bit value could indicate that all N buttons have been pressed simultaneously. In contrast, if it were not necessary to indicate that buttons were pressed simultaneously, than eight buttons, for example, could be represented by only three bits.

In one form of the invention, the buttons 126 of pointing device 100 are divided into primary buttons and secondary buttons. In one form of the invention, pointing device 100 uses one bit for each primary button, and uses less than one bit for each secondary button. Thus, the total number of bits for the button press information is less than the number of buttons. In one embodiment, pointing device 100 includes eight buttons 126, with two primary buttons (e.g., a left mouse button and a right mouse button) that are represented by one bit each, and six secondary buttons that are collectively represented by three bits. In this embodiment, pointing device 100 wirelessly transmits five bits of button press information during each reporting interval (or, in another embodiment, only when one or more of the eight buttons are pressed). The use of five bits for button press information provides the ability to indicate whether the two primary buttons were pressed simultaneously, but does not indicate whether the secondary buttons were pressed simultaneously.

It will be understood by a person of ordinary skill in the art that functions performed by pointing device 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer, the apparatus comprising:
    a movement sensor for sensing relative movement between the apparatus and a surface, and generating corresponding movement data, the movement sensor configured to generate compressed data representing the movement data, wherein the movement sensor is configured to generate the compressed data based on a logarithm-based compression algorithm and wherein the movement sensor is configured to identify a difference between the movement data and the compressed data for a current reporting period and to adjust the movement data for a subsequent reporting period based on the identified difference; and
    a wireless transmitter for wirelessly transmitting the compressed data.

2. The apparatus of claim 1, wherein the apparatus is a wireless mouse.

3. The apparatus of claim 1, and further comprising:
a light source for illuminating the surface, thereby generating reflected images, and wherein the movement sensor is configured to generate digital images based on the reflected images, and generate the movement data based on a correlation of successive ones of the digital images.

4. The apparatus of claim 1, wherein the compressed data comprises a magnitude value representing a magnitude of movement, and an angle value representing an angle of movement.

5. The apparatus of claim 4, wherein the magnitude and angle values are compressed based on a compression algorithm.

6. The apparatus of claim 1, wherein the compressed data comprises acceleration data indicative of an acceleration between the apparatus and the surface.

7. The apparatus of claim 6, wherein the acceleration data is compressed based on a compression algorithm.

8. The apparatus of claim 6, wherein the apparatus is configured to selectively wirelessly transmit the acceleration data or velocity data.

9. The apparatus of claim 1, wherein the compressed data includes a total number of bits that varies based on a magnitude of the relative movement.

10. The apparatus of claim 1, and further comprising a lookup table for storing compressed data values, wherein each compressed data value represents a two dimensional movement.

11. The apparatus of claim 1, wherein the apparatus is configured to wirelessly transmit the compressed data at irregular intervals.

12. The apparatus of claim 11, wherein the apparatus is configured to wirelessly transmit the compressed data only when there has been a change in movement since a previous motion report.

13. The apparatus of claim 1, wherein the apparatus is configured to wirelessly transmit button press information at irregular intervals.

14. The apparatus of claim 1, wherein the apparatus is configured to wirelessly transmit button press information only when the apparatus senses that a button on the apparatus has been pushed by a user.

15. The apparatus of claim 1, wherein the apparatus is configured to wirelessly transmit button press information using a lesser number of bits than there are buttons on the apparatus that are represented by the button press information.

16. An apparatus for controlling the position of a screen pointer, the apparatus comprising:
a movement sensor for sensing relative movement between the apparatus and a surface, and generating corresponding movement data, the movement sensor configured to generate compressed data representing the movement data, wherein the compressed data includes a total numberoftits that variesbased on a magnitude of the relative movement; and
a wireless transmitter for wirelessly transmitting the compressed data.

17. An apparatus for controlling the position ofa screen pointer, the apparatus comprising:
a movement sensor for sensing relative movement between the apparatus and a surface, and generating corresponding movement data, the movement sensor configured to generate compressed data representing the movement data; and
a wireless transmitter for wirelessly transmitting the compressed data;
wherein the apparatus is configured to wirelessly transmit button press information using a lesser number of bits than there are buttons on the apparatus that are represented by the button press information.

* * * * *

UNITED STATES PATENT AND TRADEMARK OFFICE
CERTIFICATE OF CORRECTION

PATENT NO. : 7,292,225 B2
APPLICATION NO. : 10/825476
DATED : November 6, 2007
INVENTOR(S) : Gary B. Gordon et al.

It is certified that error appears in the above-identified patent and that said Letters Patent is hereby corrected as shown below:

Column 14, Line 20, Claim 16, delete "numberoftits" and insert -- number of bits --;

Column 14, Line 20, Claim 16, delete "variesbased" and insert -- varies based --;

Column 14, Line 24, Claim 17, delete "ofa" and insert -- of a --.

Signed and Sealed this

First Day of June, 2010

David J. Kappos
*Director of the United States Patent and Trademark Office*